3,813,276
METHOD OF TREATING A GLASS BODY
Hendrikus Johan Lodewijk Trap, Emmasingel, Eindhoven, Netherlands, assignor to U.S. Philips Corporation, New York, N.Y.
No Drawing. Filed Apr. 25, 1972, Ser. No. 247,298
Claims priority, application Netherlands, May 29, 1971, 7107454
Int. Cl. C03c 15/00
U.S. Cl. 161—1                3 Claims

ABSTRACT OF THE DISCLOSURE

A method in which the electrical conductivity of a glass is adjusted by means of an oxidizing or reducing treatment and in which subsequently a layer is etched off the glass surface.

---

The invention relates to a method of treating a glass body consisting of glass having a composition whose surface conductivity can be varied by means of a reducing or oxidizing treatment to such an extent that electron conductance is predominant.

A plurality of such glass compositions is known, for example, PbO-containing glasses a surface layer of which is given an increased conductivity by means of heating in a hydrogen-containing atmosphere, from the United Kingdom Patent Specification 1,239,687 and 1,168,415 and French Patent Specification 1,599,614 (U.S. Appl. 62,-799/69).

An important use of these glass compositions is in the field of the continuous channel dynodes. These dynodes consist of a body having two parallel end boundary faces and being provided with a number of channels which are either or not at right angles to said end boundary faces and which are open at both ends. Both end boundary faces are coated with an electrically conducting layer and a voltage difference is applied therebetween. Under the influence of the electric field thus obtained electrons move through the said channels from one side of the electrode to the other.

The walls of the channels consist of, for example, a PbO-containing glass as mentioned above which glass in itself does not have the desired surface resistance and is not capable of supplying electrons but obtains this property by the mentioned reduction treatment. In addition this type of glass has a secondary emission factor of more than one at the electron speed caused as a result of the conventional voltage difference. This means that for each electron impinging upon the wall an average of more than one is released from the wall.

A glass body for such a dynode which has a diameter of for example, 3–10 cms. a thickness of 1–2.5 mms. and a plurality of apertures in the order of $10^5$ sq. cm. having an average cross-section of approximately 20–40$\mu$ per aperture is manufactured while starting from a glass tube which is drawn out while being heated. The tubes obtained are bundled and the assembly is again drawn out, bundled and subsequently combined in a jig and heated until the wall material of the tubes is interconnected together and fills up the interstices by flowing together of the material.

Also manganese-containing oxide glasses are known *inter alia* for the same purpose, but the desired value of their surface resistance must be adjusted by means of an oxidizing treatment at an elevated temperature.

It was found from experiments that the lead particles formed during the reduction and hence being responsible for conductance are not located immediately at the glass surface but are distributed over a depth of between 100 and 20,000 A. Also for the manganese-containing glasses whose electrons responsible for conductance are provided in a given balanced ratio from the combination MnO-$Mn_2O_3$ the conductance optimum was found to extend to approximately the same depth.

According to the invention the method of adjusting the value of the electrical conductivity of a glass by means of a treatment at an elevated temperature causing electron transfer is characterized in that subsequent to the aforementioned treatment the glass is contacted with an alkaline aqueous solution or with a hydrofluoric acid containing solution for such a period that a layer of between 200 and 10,000 A. is etched off the glass surface. In fact, when etching it is important that in addition to the removal of the lattice modifying ions, the SiO lattice is also attacked.

The method according to the invention provides a much more reproducible value of the surface resistance. In addition a higher secondary emission factor is reached than with a type of glass which is not treated in according with this method. When using glass thus treated in a dynode much higher multiplication factors are obtained. The method is particularly suitable for use in those cases where it has so far been impossible to give a lead-glass a surface conductance of at least $10^{10}$ ohms per square by means of a single reducing treatment. The method is also suitable for those cases where the surface conductance has greatly decreased as a result of a heat treatment.

A glass treated in accordance with the invention may furthermore be used for the neck of a television display cathode-ray tube.

The invention will now be described in detail with reference to the following Examples.

(1) A plurality of glasses having a composition according to Table 1 was melted, poured out and sawn into blocks having dimensions of 20 x 10 x 5 mms. A plurality of these blocks, i.e. one of each composition was exposed for 6 hours in a continuous hydrogen stream at a rate of 5 liters/minute and heated at the temperature indicated in the Table. An equal plurality was subjected to the same treatment, but subsequently the samples were maintained immersed for the period indicated in a 6 N NaOH solution at room temperature, rinsed in deionized water and dried. Again the same plurality was heated for 3 hours in the hydrogen atmosphere at the temperature stated and finally an equal plurality was exposed to the same treatment and the samples were maintained immersed in a 6 N NaOH solution for the indicated period, rinsed and dried. The Table states the logarithm of the obtained surface resistance (log $\chi$), $\chi$ expressed in ohms and measured at room temperature and in vacuo.

TABLE I

| Sample number | Composition in mol percent ||||||| Log χ (ohm) |||| Temperature (°C.) reduction | Etching rate |
| | SiO₂ | PbO | Bi₂O₃ | Na₂O | K₂O | Al₂O₃ | | 6 hr. reduction || 3 hr. reduction || | |
| | | | | | | | | Without etching | With etching | Without etching | With etching | | |
|---|---|---|---|---|---|---|---|---|---|---|---|---|---|
| 1 | 72.6 | 10.8 | 2.5 | 5.9 | 6.9 | 1.1 | As₂O₃ 0.2 | 13.4 | 12.2 | 13.4 | 12.8 | 300 | 30 |
| 2 | 73.4 | 4.9 | 2.0 | 16.0 | ------- | 0.1 | CaO, 1.8; ZnO, 1.7; As₂O₃, 0.1 | 13.5 | 13.2 | 13.6 | 13.5 | 320 | 20 |
| 3 | 72.4 | 10.7 | 2.0 | 9.8 | 3.7 | 1.0 | As₂O₃, 0.1; MnO, 0.2; CaO, 0.1 | 12.7 | 12.2 | 12.9 | 12.6 | 335 | 15 |
| 4 | 66.0 | 11.2 | 2.0 | 9.8 | 9.6 | 1.1 | CaO, 0.2; As₂O₃, 0.1 | 13.4 | 12.7 | 13.4 | 13.1 | 325 | 15 |
| 5 | 67.1 | 14.9 | 2.0 | 2.1 | 9.5 | 1.0 | CaO, 3.1; As₂O₃, 0.1; MnO, 0.2 | 12.0 | 11.2 | 12.1 | 11.7 | 400 | 20 |
| 6 | 71.9 | 10.3 | 2.0 | 4.6 | 7.5 | 0.6 | As₂O₃, 0.1; CaO, 3.0 | 13.0 | 12.4 | 13.3 | 13.0 | 350 | 30 |
| 7 | 73.2 | 4.9 | 2.5 | 15.6 | ------- | 0.1 | CaO, 1.8; ZnO, 1.7; As₂O₃, 0.2 | 13.7 | 13.3 | 13.8 | 13.6 | 325 | 20 |
| 8 | 72.4 | 10.4 | 2.5 | 9.6 | 3.6 | 1.0 | CaO, 0.1; As₂O₃, 0.2; MnO, 0.2 | 12.3 | 11.7 | 12.4 | 12.0 | 350 | 15 |

Approximately 500 A. was etched off the surface of the sample.

(2) A plurality of glasses having a composition according to Table 2 was melted, poured out and sawn into blocks having dimensions of 20 x 10 x 5 mms.

A plurality of these blocks, i.e. one of each composition was heated in air for 3 hours at the temperature stated in the Table. An equal plurality was subjected to this treatment but subsequently the samples were maintained immersed in a 6 N NaOH solution at room temperature for the period stated in the Table, subsequently rinsed in deionized water and dried. Again an equal plurality was heated in air for 6 hours at the stated temperature and finally an equal plurality was subjected to the treatment whereafter the samples were maintained immersed in a 6 N NaOH solution for the stated number of minutes, rinsed and dried. The Table again states the logarithm of the surface resistance obtained (log χ) in which χ expresses ohms/square and is measured at room temperature and in vacuo.

Approximately 500 A. was etched off the samples.

What is claimed is:

1. A method of adjusting the value of the electrical conductivity of a glass by means of a treatment at an elevated temperature causing electron transfer, characterized in that subsequent to this treatment the glass is contacted with an alkaline aqueous solution or with a hydrofluoric acid containing solution for such a period that a layer of between 200 and 10,000 A. is etched off the glass surface.

2. A glass body for a continuous channel dynode made in accordance with the method as claimed in claim 1.

3. A method as claimed in claim 1 in which the treatment at an elevated temperature causing electron transfer is exposure to hydrogen, and the alkaline aqueous medium is an NaOH solution.

TABLE II

| Sample number | Composition in mol percent ||||||| Log χ (χ in ohm) |||| Oxide temp. (°C.) | Etching rate (min.) |
| | SiO₂ | Al₂O₃ | MnO | Na₂O | K₂O | Li₂O | As₂O₃ | 3 hr. oxide || 6 hr. oxide || | |
| | | | | | | | | Without etching | With etching | Without etching | With etching | | |
|---|---|---|---|---|---|---|---|---|---|---|---|---|---|
| 9 | 73.1 | 1.1 | 12.8 | 5.9 | 6.9 | --------- | 0.2 | ------- | ------- | 16.0 | 15.9 | 350 | 30 |
| 10 | 71.1 | 1.1 | 14.8 | 5.9 | 6.9 | --------- | 0.2 | 16.1 | 15.8 | 16.0 | 15.5 | 300 | 15 |
| 11 | 75.1 | 1.1 | 10.8 | 5.9 | 6.9 | --------- | 0.2 | 15.8 | 15.4 | 15.4 | 15.1 | 350 | 60 |
| 12 | 73.1 | 1.1 | 12.8 | 5.9 | --------- | 6.9 | 0.2 | 13.0 | 12.1 | 13.0 | 12.1 | 400 | 30 |
| 13 | 71.1 | 1.1 | 14.8 | 5.9 | --------- | 6.9 | 0.2 | 12.6 | 11.1 | 12.4 | 11.0 | 400 | 15 |

References Cited

UNITED STATES PATENTS 3,492,523   1/1970   Smith et al. _____ 156—24 X
3,687,799   8/1972   Spanoudis _____ 65—31 X WILLIAM A. POWELL, Primary Examiner U.S. Cl. X.R.

65—31; 156—24